H. A. WAHLERT.
BRAKE HANGER.
APPLICATION FILED DEC. 16, 1916.

1,282,995.

Patented Oct. 29, 1918.

INVENTOR
Henry A. Wahlert
By Edward A. Wright
Atty.

UNITED STATES PATENT OFFICE.

HENRY A. WAHLERT, OF ST. LOUIS, MISSOURI, ASSIGNOR TO THE AMERICAN BRAKE COMPANY, OF ST. LOUIS, MISSOURI, A CORPORATION OF MISSOURI.

BRAKE-HANGER.

1,282,995.  Specification of Letters Patent. Patented Oct. 29, 1918.

Application filed December 16, 1916. Serial No. 137,282.

*To all whom it may concern:*

Be it known that I, HENRY A. WAHLERT, a citizen of the United States, and a resident of St. Louis, in the State of Missouri, have invented a certain new and useful Improvement in Brake-Hangers, of which improvement the following is a specification.

This invention relates to brake hangers for brake shoes and brake beams, and has for its object to provide an improved form of hanger and connections between the same and the brake head, whereby the distance between the center pin in the hanger and brake head to the face of the wheel tread is reduced to a minimum, and the brake design may readily be applied to a closely connected truck having a minimum distance between wheel centers.

Figure 1:
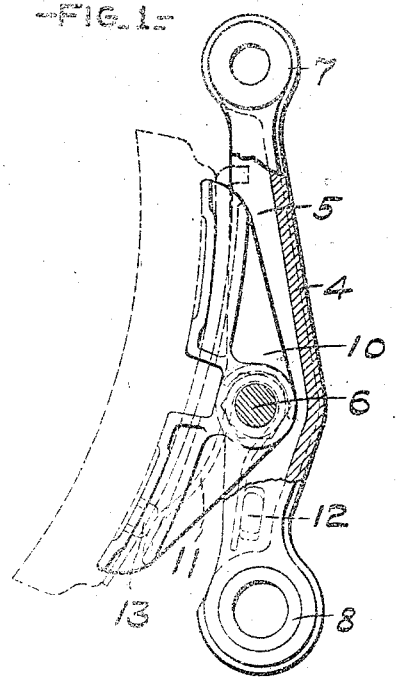
Figure 2:
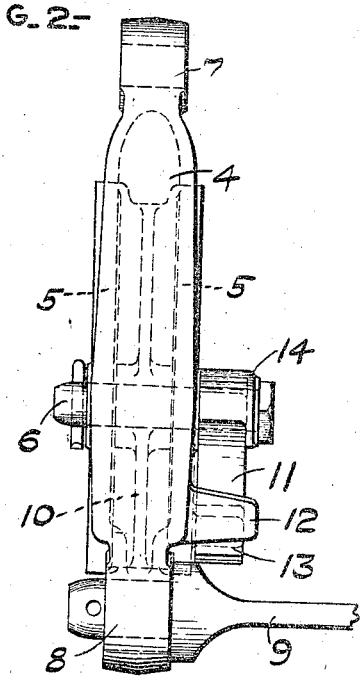
Figure 3:
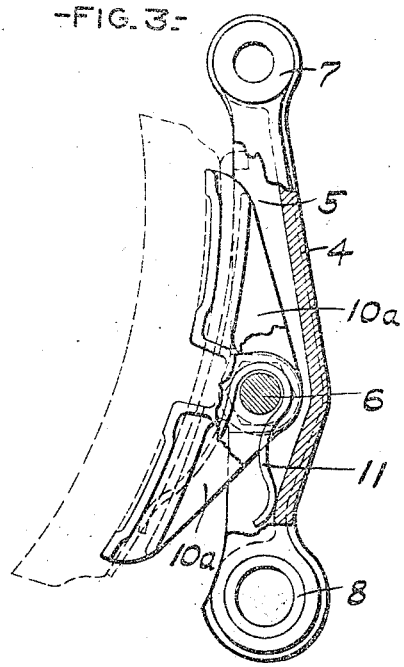

In the accompanying drawing: Figure 1 is a side elevation, partly in vertical section, of a brake hanger and connection embodying my improvement; Fig. 2, a rear elevation of the same; Fig. 3, a view similar to Fig. 1, but showing a modification; and Fig. 4, a rear elevation of the modification shown in Fig. 3.

My improvement is particularly adapted for use in connection with brake designs wherein the brake beam is pivotally supported at the lower end of the hanger, while the brake head is pivotally connected thereto at an intermediate point, the brake beams being actuated by a system of truck levers connected therewith. In designs of this type where the distance between wheel centers is very short, it is very difficult to apply the usual type of hanger and brake head connection, but by using my improved construction, the design may be readily applied.

According to the construction shown in Figs. 1 and 2, the hanger is made in the form of a channel in cross section, having a web, 4, and flanges, 5, 5, the channel being deepest at the pivot point of the brake head where the two side flanges, 5, are provided with the pin holes for the brake head pivot pin, 6, the upper end of the hanger being finished in the form of an eye, 7, for pivotal attachment to truck frame or bracket, and the lower end also being formed with an eye, 8, for a pivotal connection with the end of the brake beam, 9.

The brake head is provided with the central projecting rib, 10, of nearly the same thickness as the distance between the flanges, 5, of the hanger between which it extends and is mounted on the pivot pin, 6. For the purpose of balancing the brake head, a balancing spring, 11, may be mounted on the pivot pin or bolt, 6, at one side of the hanger where the bolt is extended through one of the side flanges, 5, the spring being bent around the bolt and having one end bearing against a lug, 12, projecting from the side of the hanger, and the other end bearing against a lug, 13, on the brake head. A shield or cover, 14, for protecting the spring may be mounted on the bolt, 6, between the bolt head and the side of the hanger.

Figure 4:
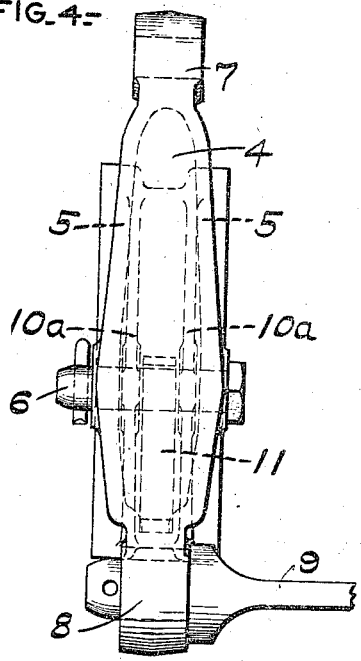

The construction shown in Figs. 3 and 4 is substantially the same as that above described except that the brake head is provided with two projecting ribs or flanges, 10$^a$, 10$^a$, spaced apart, in lieu of the single rib, and the balancing spring, 11, is mounted on the pivot bolt, 6, in the space between these ribs rather than at the side of the hanger. This makes the construction somewhat wider than that shown in Figs. 1 and 2, but is regarded as the preferred construction where there is plenty of room for the wide type of hangers. When the available space in this direction is limited, the form of hanger shown in Fig. 1 may preferably be employed.

It will now be seen that I have provided a simple, compact, and durable hanger construction, and one in which the distance between the pivot pin and the face of the wheel tread is reduced to a minimum. The shape of the hanger also forms a protection for the brake head as it substantially covers the same and prevents access of dirt and other foreign matter to the interior of the joint.

Having now described my invention, what I claim as new and desire to secure by Letters Patent is:

1. The combination of a hanger formed with a single eye section at each end and two side members spaced apart and formed integral with said eye-sections, a brake head having a projecting rib extending between said side members of the hanger, and a pivot pin extending through said side members and said rib.

2. The combination of a hanger formed with an eye section at each end and two side members spaced apart and formed integral with said eye-sections, a brake head having a projecting rib extending between said side members of the hanger, a pivot pin extending through said side members and said rib, and a balancing spring mounted on said pivot pin.

3. The combination of a hanger formed of a channel section with two flanges spaced apart, a brake head having a rib extending into the space between said flanges, and a pivot pin extending through said flanges and rib.

4. The combination of a hanger formed with a channel section and eye members at its ends, a brake head having a projecting rib extending between said flanges at the deepest point of the channel section, and a pivot pin extending through said flanges and rib.

5. The combination of a hanger formed of two side members spaced apart, a brake head having projecting ribs extending between said members, a pivot pin passing through said members and ribs, and a balancing spring mounted on said pin between the ribs of the brake head.

In testimony whereof I have hereunto set my hand.

HENRY A. WAHLERT.